Aug. 14, 1951   G. B. W. VEITCH   2,564,631
MACHINE FOR THE MANUFACTURE OF PILE AND
TUFTED FABRICS, RUGS, AND CARPETS
Filed June 28, 1949   7 Sheets-Sheet 2

Inventor,
George B.W. Veitch,
by Hall & Houghton
Attorneys.

Aug. 14, 1951     G. B. W. VEITCH     2,564,631
MACHINE FOR THE MANUFACTURE OF PILE AND
TUFTED FABRICS, RUGS, AND CARPETS
Filed June 28, 1949     7 Sheets-Sheet 5

Inventor,
George B. W. Veitch,
by Hall & Houghton,
Attorneys.

Aug. 14, 1951  G. B. W. VEITCH  2,564,631
MACHINE FOR THE MANUFACTURE OF PILE AND
TUFTED FABRICS, RUGS, AND CARPETS
Filed June 28, 1949  7 Sheets-Sheet 6

Inventor,
George B. W. Veitch,
by Hall + Houghton,
Attorneys.

Aug. 14, 1951   G. B. W. VEITCH   2,564,631
MACHINE FOR THE MANUFACTURE OF PILE AND
TUFTED FABRICS, RUGS, AND CARPETS
Filed June 28, 1949                                   7 Sheets-Sheet 7

Inventor,
George B.W. Veitch,
by Hall & Houghton
Attorneys.

Patented Aug. 14, 1951

2,564,631

UNITED STATES PATENT OFFICE 2,564,631

MACHINE FOR THE MANUFACTURE OF PILE AND TUFTED FABRICS, RUGS, AND CARPETS

George Bertie Waddel Veitch, Inverness, Scotland

Application June 28, 1949, Serial No. 101,800
In Great Britain April 5, 1948

1 Claim. (Cl. 112—79)

This invention has reference to machines for the manufacture of pile and tufted fabrics such as fur fabric, upholstery material, rugs and carpets.

A preferred embodiment of the invention will now be described with reference to the annexed drawings wherein.

Figure 5:
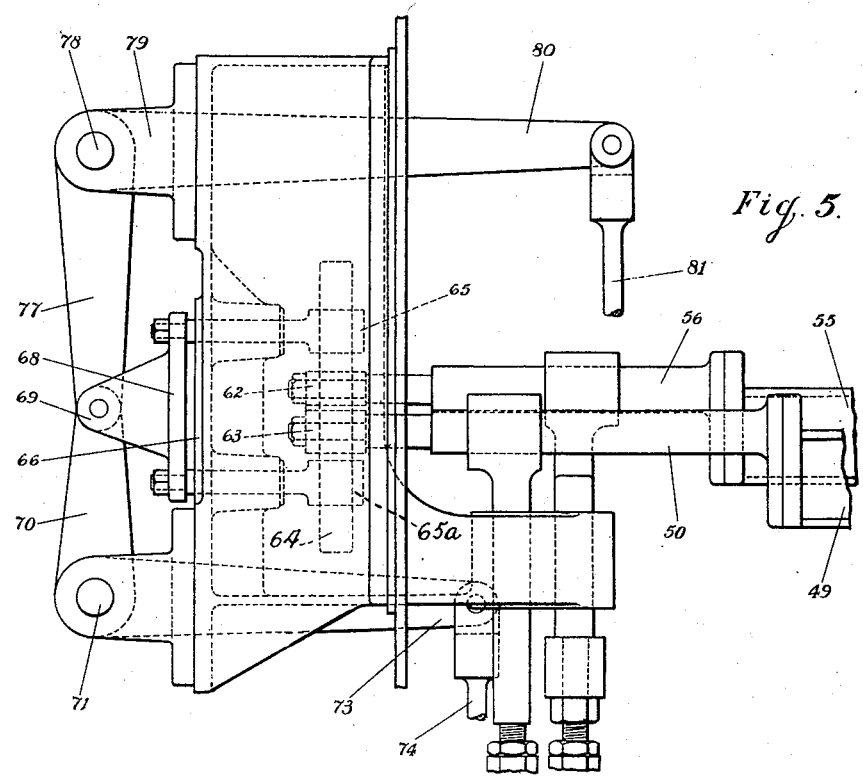
Figure 6:
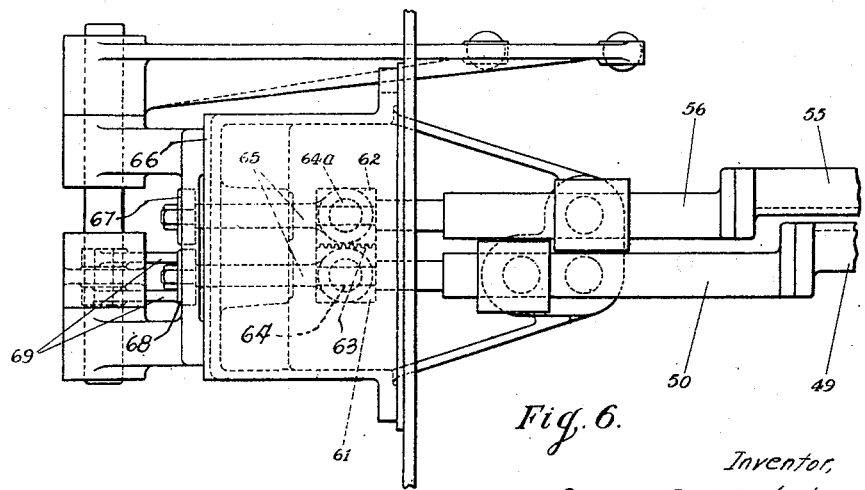
Figure 7:
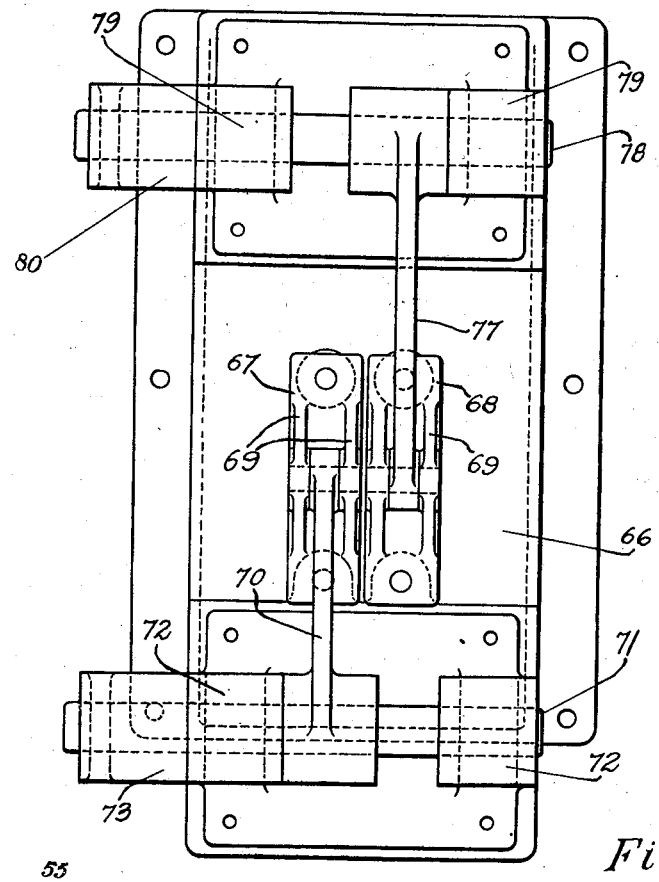
Figures 12, 13:
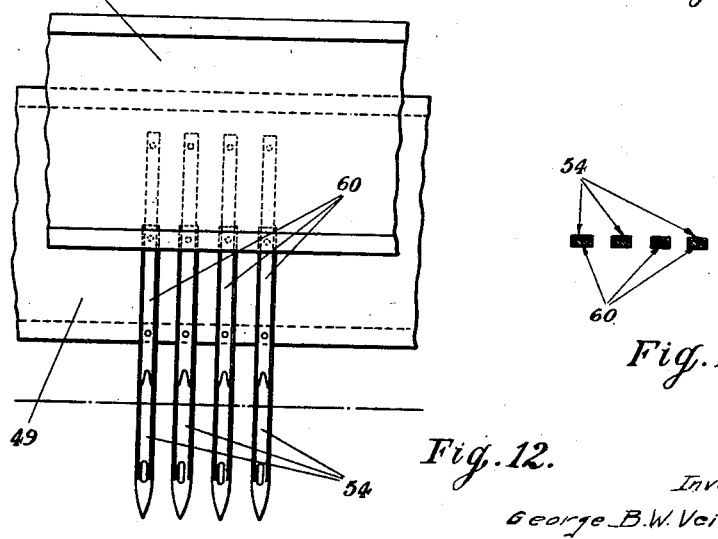

Figures 5, 6 and 7 are elevation, plan view and end view respectively, to a larger scale, of the mechanism by which the transverse movements are imparted to the needle and loop retaining prong carrying beams, Figures 8, 9, 10 and 11 are views showing the cycle of movement of the needles and loop retaining prongs together with elevation views of the stitching formed by three needles, Figure 12 shows parts of the needle and loop retaining prong carrying beams together with a number of needles and prongs, and Figure 13 is a sectional plan view of a series of needles and loop retaining prongs.

In describing the machine and its operation the means by which the foundation material, is placed under transverse tension and fed forwards step by step will first be described.

The foundation material in the form of a roll or batch 20 is supported on a spindle 21 and is passed over a transversely extending roller 22 over which extends a brush 22ª provided with spirally arranged bristles, the bristles on one side of the longitudinal centre line of the machine being in the form of left hand spirals and those on the other side form right hand spirals. The bristles are of such length and are so set that they are splayed outwards to the outer side when they bear on the foundation material and their action is such that they spread the said material outwards as it passes therebelow. The foundation material is then passed below a further transversely extending roller 23, then over another roller 24 and then over a pair of temples 24ª. Said temples comprise a series of aligned rotatably mounted rings provided with radial pins, the discs being mounted to lie at an angle to the axis of the temple. The pins engage with the edges of the foundation material and as the rings rotate they serve to stretch transversely the said material.

Figure 2:
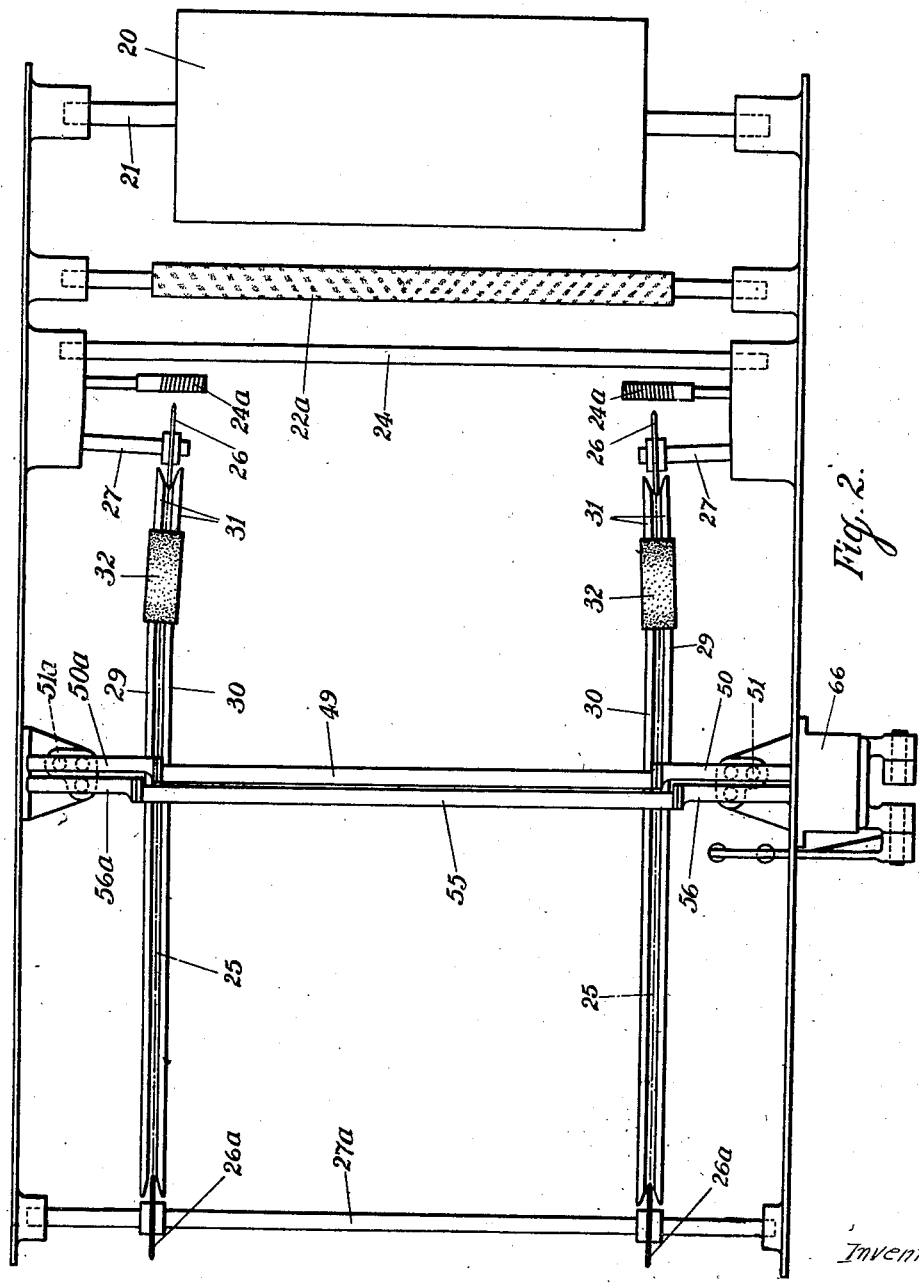
Figure 2 is a plan view thereof, certain parts being omitted.

Extending longitudinally of each side of the machine are two endless chains 25 which pass over sprocket wheels 26 and 26ª mounted on spindles 27 and 27ª. Said chains carry a series of blocks 28, see Figures 3 and 4, from which project a series of sharp pointed pins. The upper runs of the blocks pass between longitudinally extending guides 29 and 30. As shown clearly in Figure 2 the guides at one end of the machine diverge from each other as at 31. At the same end of the machine immediately above the guides are rotatably mounted brushes 32.

Figure 1:
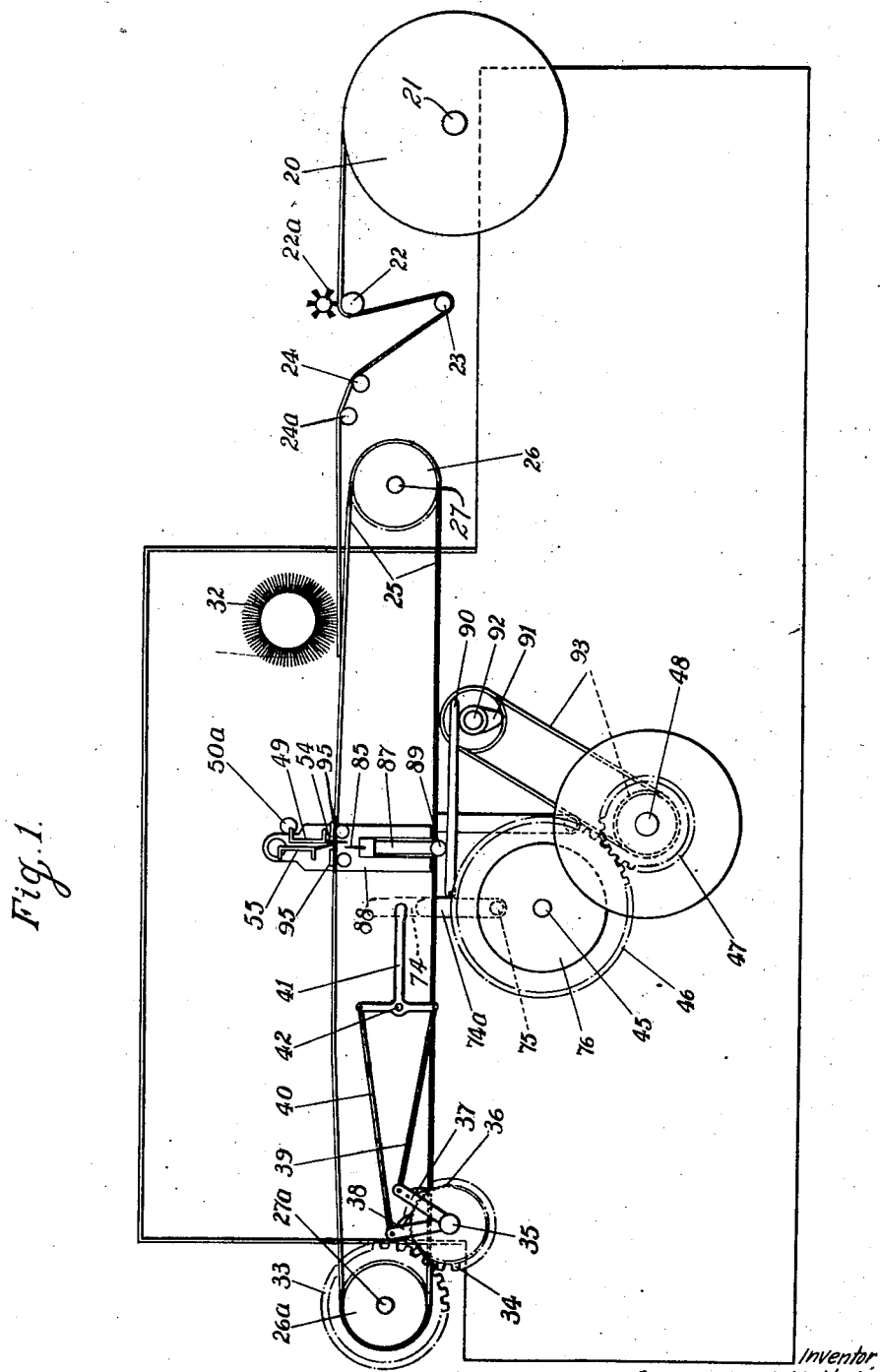
Figure 1 is a diagrammatical elevation of the machine.

Fast on the spindle 27ª at the other end of the machine is a toothed wheel 33 shown only in Figure 1, with which meshes a second toothed wheel 34 fast on a spindle 35 on which is keyed a ratchet wheel 36. Loose on this spindle 35 are two arms 37 and 38 which carry pawls which engage with the ratchet wheel. Said arms are connected by links 39 and 40 to two arms of a three armed lever 41, pivoted at 42. Cam means, hereafter described, actuate the third arm of the lever so as to impart a rocking movement to the lever about its pivot.

When the machine is in operation the brushes 32 force the edges of the foundation material, after passing over the temples 24ª, into engagement with the pins carried by the blocks 28. The latter are moved step by step by the pawls carried by the arms 39 and 40 co-operating with the ratchet wheel 33, said arms being operated by the rocking movement transmitted to the three armed lever by the cam means to be described. The foundation material is thus fed step by step and, by the action of the brush 22ª, the temples and the formation of the guides 29 and 30, it is held under transverse tension.

The needles and loop retaining prongs and the means for their operation will now be described.

Extending transversely of the machine is a needle carrying beam 49, which, at each end thereof, is provided with an outwardly extending spindle 50 and 50ª keyed to slide axially in bearings on the upper ends of rods 51 and 51ª. Said rods, which are supported to slide vertically in guides, carry rollers 52 and 52ª at their lower ends, said rollers riding in cam tracks in discs 53 and 53ª fast on a shaft 48 which is driven by a motor, not shown. Secure to said beam is a series of needles 54 which, above their points, are of channel cross section as shown clearly in Figures 12 and 13.

Also extending transversely of the machine is a second beam 55 which at each end thereof is provided with outwardly extending spindles 56 and 56ª freely mounted in bearings on the upper ends of rods 57 and 57ª. Said rods are also supported to slide vertically in guides and at their lower ends carry rollers 58 and 58ª which ride in cam tracks in discs 59 and 59ª fast on the shaft 48. Secured to the beam is a series of loop retaining prongs 60. There is a prong for each needle, the prongs fitting within the channels of the needles.

The spindles 50, 50ᵃ and 56, 56ᵃ carrying the two beams are axially slidable in their supporting bearings and the spindle 50 and 56 at their outer ends carry blocks 61 and 62 respectively, the opposed faces of which are provided with intermeshing vertically extending teeth 63 having tapered ends, see Figure 6. Said blocks have holes therein through which extend pins 64 and 64ᵃ, the pins being slidable vertically with the blocks. Each pin is carried by an upper and lower eye-bolt 65 and 65ᵃ slidable horizontally in bosses formed in a casing 66 secured to the side of the machine frame. The two pairs of eye-bolts are carried by plates 67 and 68 provided with brackets 69. The brackets of the plate 67 has pivoted therebetween one end of an arm 70 the other end of which is fast on a spindle 71 supported by lugs 72 projecting from said casing. Also fast on said spindle 71 is one end of an arm 73, the other end of which is connected to the upper end of a connecting rod 74. This rod is connected to a rod 74ᵃ which passes through suitable guides and at its lower end carries a roller 75 which travels in a cam track in a disc 76 fast on a spindle 45. This spindle is driven by the shaft 48 through spur wheels 47 and 46. The third arm of the aforesaid three armed lever 41 is connected to the rod 74 so that the vertical movement imparted to the rod imparts a rocking movement to the lever and the latter, through the pawl and ratchet mechanism feeds forward step by step the foundation material.

Likewise the brackets of the plate 68 have pivoted therebetween one end of an arm 77 the other end of which is fast on a spindle 78 supported by lugs 79 also projecting from said casing. Also fast on said spindle is one end of an arm 80 the other end of which is connected to the upper end of a connecting rod 81 which is connected to a rod 82 which passes through suitable guides and at its lower end carries a roller 83. This roller rides in a cam track in a disc 84 fast on the spindle 45.

Extending transversely of the machine and below the loop retaining prongs is a knife blade 85 which at its ends is supported by outwardly extending spindles 86 which fit into blocks 87 accommodated to slide between the limbs of two inverted U frames 88 supported by the spindles 56 and 56ᵃ of the beam 55. One of said blocks carries a solenoid whereby a transverse vibratory motion is given to the knife.

Each block carries a roller 89 which rollers rest on levers 90, one at each side of the machine. Each of said levers is pivoted at one end while its other end rests on a rotary cam 91. The two cams are fast on a transverse shaft 92 which is driven through a sprocket wheel and chain drive 93 from the shaft 48.

Transversely extending presser feet 95, see Figure 1, bear on the foundation material and on the newly formed row of stitches, cam means raising the presser feet at each step by step feed movement of the basic fabric.

Figure 3:
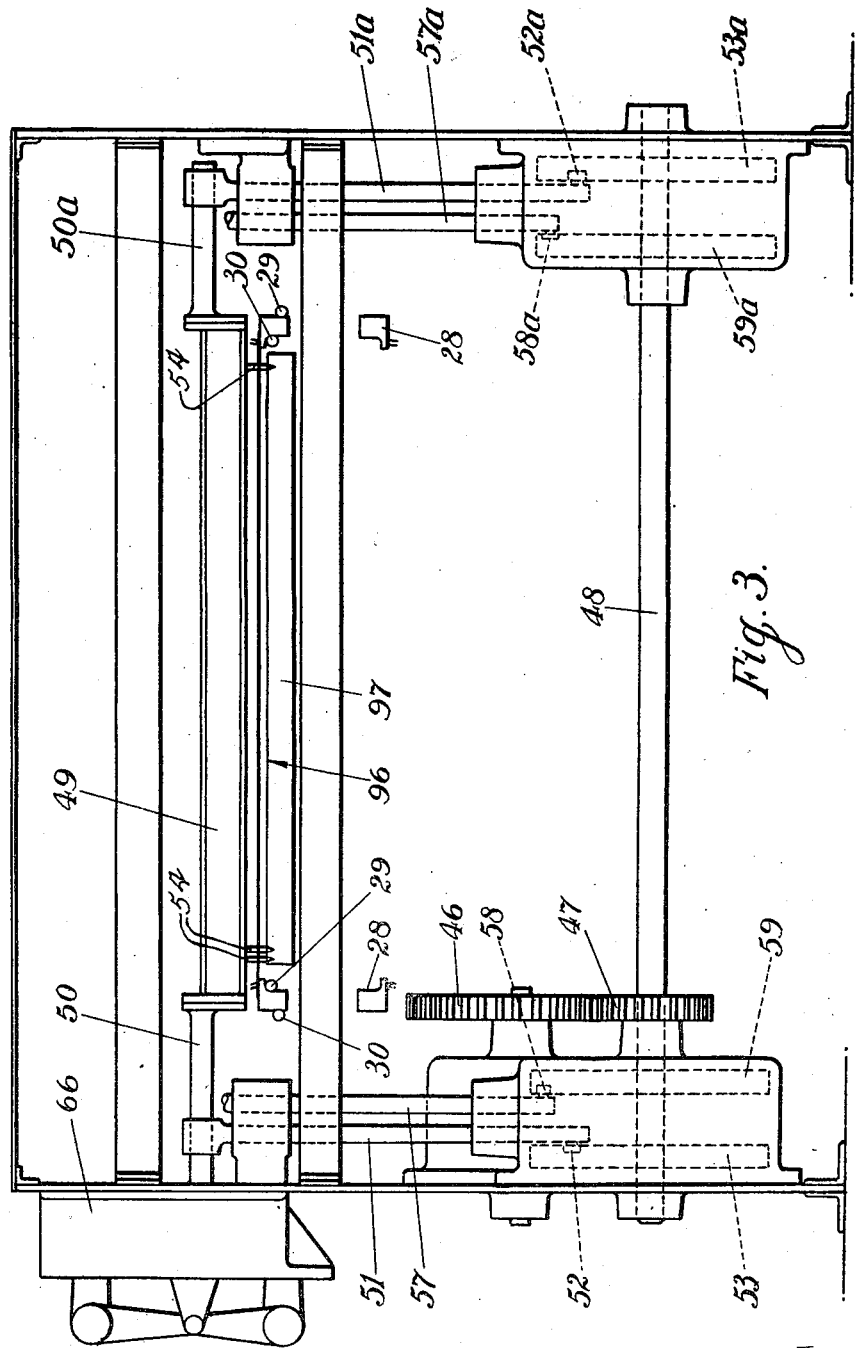
Figure 3 is an end elevation of the machine looking to the left.
Figure 4:
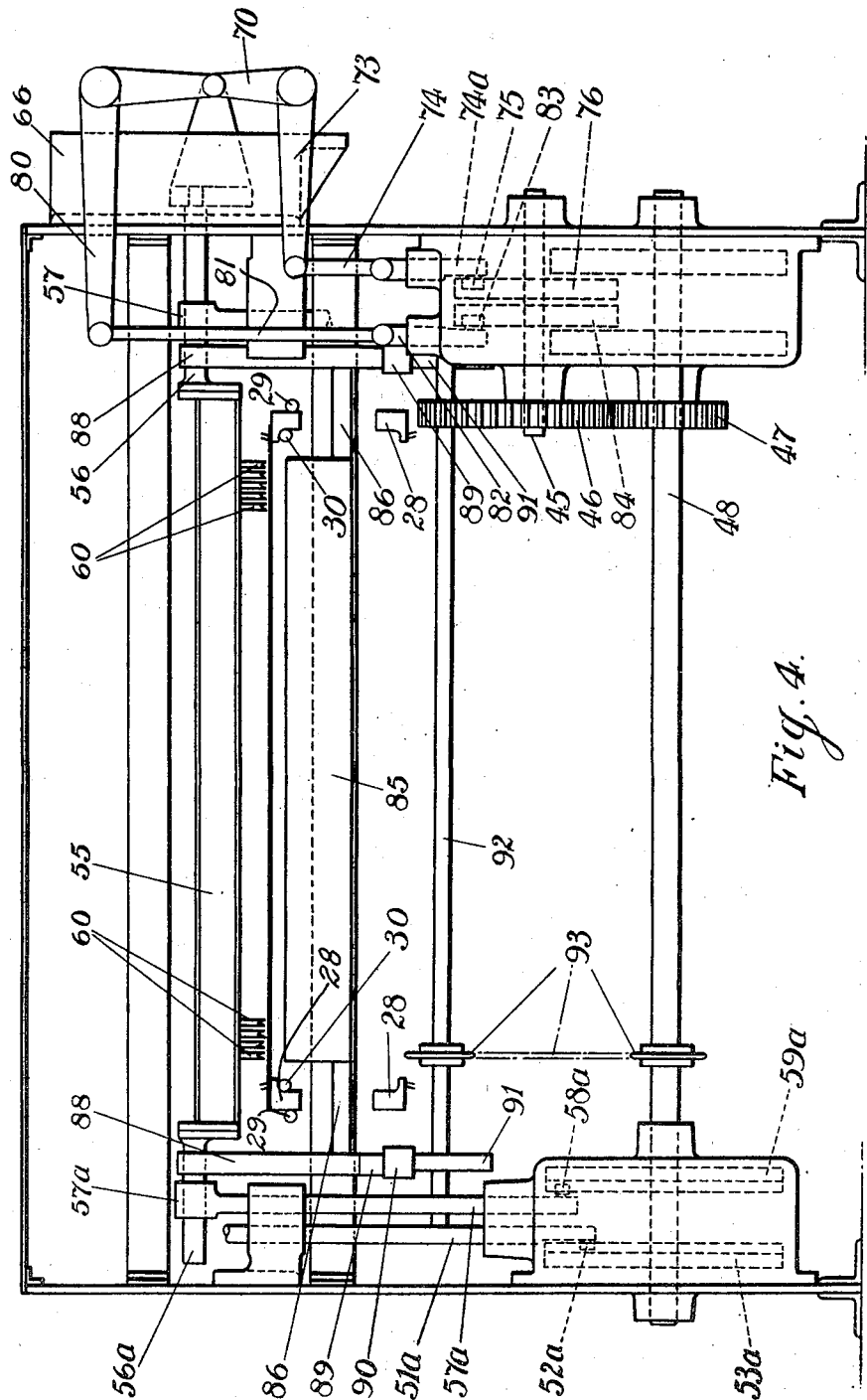
Figure 4 is an end elevation of the machine looking to the right.

On the underside of the foundation material is a supporting grid 96, see Figure 3, carried by a frame 97, the interstices being such as will permit of the passage of the needles therethrough.

The formation and timing of the cams will be understood from the description of the cycle of operations.

Figure 8:
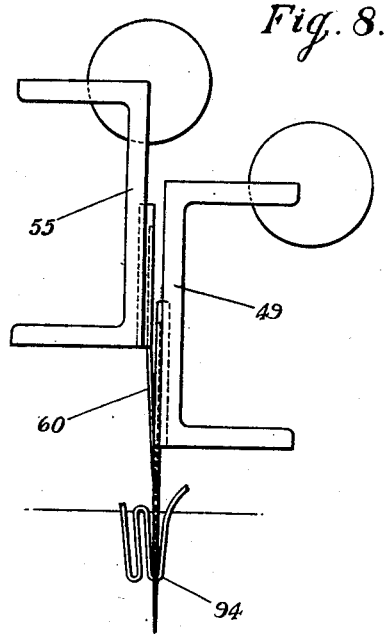
Figure 9:
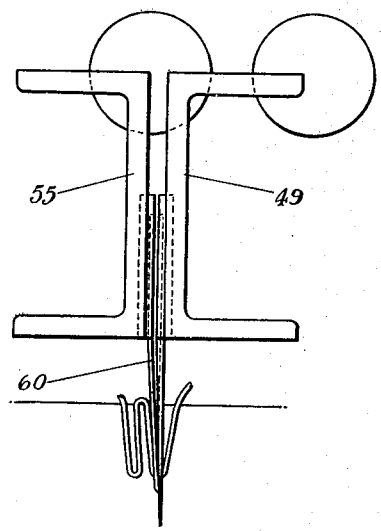
Figure 10:
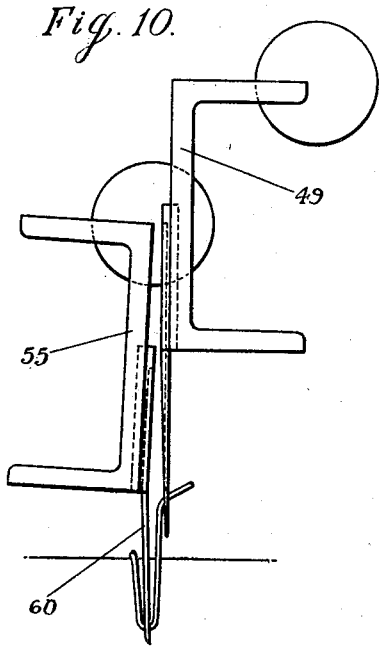
Figure 11:
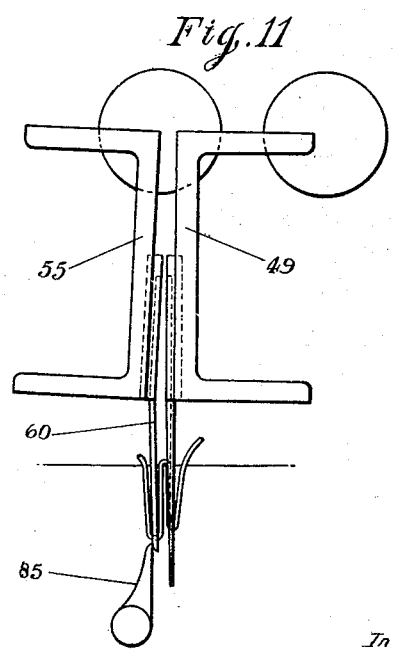

After each feed movement of the foundation material the cam tracks of the discs 53 and 53ᵃ operate to pull downwardly the needle carrying beam 49 whereon the needle penetrates the foundation material supported below by the grid 96, so that the yarn or threads threaded through the eyes of the needles form loops 94 as shown in Figure 8. While the needles remain in such position the cam tracks of the discs 59 and 59ᵃ operate to pull downwardly the beam 55 carrying the loop retaining prongs. A prong slides in the channel of each needle to engage with and hold the lower end of the loop, as shown by Figure 9. Thereafter the needle carrying bar is raised, the presser feet holding down the fabric. The foundation material is then fed forward a step, the presser feet rising to permit of this and the beam carrying the loop retaining prongs swivelling to allow this feed movement as shown clearly in Figure 10. The knife 85 then rises to cut the loops of the preceding row, the loop retaining prongs are raised, moved transversely and then lowered to retain the last made row of loops. Preparatory to the needles again entering the foundation material to form the next row of stitches, the cam track of the disc 76 operates through the rods 74ᵃ and 74 and through the arms 73 and 70 to move the needle beam transversely so that when the needles penetrate the foundation material to form the next row of stitches, as shown by Figure 11, such stitches will be staggered with respect to the stitches of the preceding row.

Thereafter the beam 55 carrying the loop retaining prongs is raised by the action of the cam tracks in the discs 59 and 59ᵃ and then the cam track in the disc 84 operates to move the beam 55 transversely so that, when said beam is lowered the loop retaining prongs will enter the channels of the corresponding needles to engage with the loops.

It is essential that the prongs should register accurately with the needles and for that reason the blocks 61 and 62 are provided with the vertical teeth 63 having tapered ends. When the beam 55 is lowered the teeth carried by the block 62 cooperate with and are guided by the teeth of the block 61 so that the loop retaining prongs must register with the needles. Thereafter the needles are raised, moved transversely in the reverse direction and then moved so that the needles penetrate the foundation material to form the next row of loops, the foundation material having been previously again fed forward one step. In like manner succeeding rows of loops are formed to form the pile fabric, carpet or rug.

The loops may be left uncut but in such case the knife and its operating mechanism is omitted or rendered inoperative.

As shown in Figure 12 the needles are not positioned closely adjacent to each other. If they were so positioned they would be liable to rupture the foundation material and damage the needles.

When spaced apart, provided no transverse movement is imparted thereto the needles would form rows of loops which give a ribbed effect.

By reason of the transverse movements imparted to the beams there are no gaps between the rows so that a regular or non ribbed pile or tufted fabric, carpet or rug is obtained.

The length and density of the pile can be adjusted by the calibre of the needles and loop holders, the spacing of the needles and loop holders, the yarn or thread count, the length of loop holder insertion, the length of the take up or feed motion of the foundation material, the amount of transverse movement or any combination of these.

I claim:

A machine for the manufacture of pile and tufted fabrics, rugs and carpets comprising means by which the foundation material of the fabric, rug or carpet is placed under transverse tension and intermittently fed forward in combination with a transversely extending series of loop forming needles, through each of which the yarn or thread to form the pile of tufts is threaded, the needles being spaced so as to form a gap between adjacent needles, a corresponding series of loop retaining prongs, means whereby the said needles and prongs are caused to enter the foundation material, while it is held under transverse tension, in timed relationship in such manner that after the needles enter the fabric to form the loops the prongs follow to retain the loops while the needles are withdrawn preparatory to forming the next row of loops and means by which the loop forming needles and loop retaining prongs are also given a transverse movement so that the loops of adjacent rows are staggered with respect to each other whereby a non-ribbed and compact pile can be formed.

GEORGE BERTIE WADDEL VEITCH.

REFERENCES CITED

The following references are of record in the file of this patent:

UNITED STATES PATENTS

| Number | Name | Date |
|---|---|---|
| 876,562 | Klentgen | Jan. 14, 1908 |
| 1,785,625 | Hanson | Dec. 16, 1930 |
| 1,960,100 | Doubler | May 22, 1934 |
| 2,365,013 | Sharkey et al. | Dec. 12, 1944 |